United States Patent Office 3,221,054
Patented Nov. 30, 1965

3,221,054
N-PROPARGYL-PHENOXYALKYLAMINES
Richard Bentham Arnold, Shenfield, Joseph Perry Johnston, Upminster, William Robert Wragg, Woodford Green, and Donald Robert Maxwell, Shenfield, England, assignors to May & Baker Limited, Dagenham, Essex, England, a British company
No Drawing. Filed Dec. 27, 1962, Ser. No. 247,555
Claims priority, application Great Britain, Jan. 4, 1962, 386/62; Mar. 26, 1962, 11,444/62
7 Claims. (Cl. 260—570.7)

This invention relates to new alkylamines of therapeutic utility, to processes for their preparation, and to pharmaceutical compositions containing them.

According to the present invention, there are provided the new phenoxy- and phenylthio-alkylamines of the general formula:

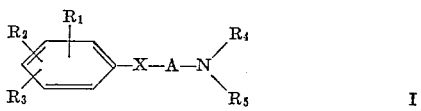
I wherein X represents an oxygen or sulphur atom, A represents an alkylene chain of two to six carbon atoms, which may be substituted by up to two lower alkyl groups, $R_1$, $R_2$ and $R_3$ are the same or different and represent lower alkyl, lower alkoxy, allyl or trifluoromethyl groups or fluorine, chlorine, bromine or hydrogen atoms, $R_4$ represents either a propargyl or a cyclopropyl group, and $R_5$ represents a hydrogen atom or a lower alkyl or lower alkoxycarbonyl group, and acid addition salts of the said compounds.

The word "lower" as applied in this specification and accompanying claims to alkyl, alkoxy and alkoxycarbonyl groups means that the alkyl, alkoxy or alkoxycarbonyl group contains at most four carbon atoms, which may be arranged in straight or branched chains.

The aforesaid phenoxy- and phenylthio-alkylamines are potent inhibitors of monoamine oxidase and possess pharmacological properties of utility in the treatment of psychiatric disorders; for example, N-methyl-N-propargyl-3-(2,4-dichlorophenoxy)propylamine and acid addition salts thereof elevate the mood of psychotic patients. In addition, the aforesaid alkylamines have a hypotensive effect and, therefore, may be used in the treatment of hypertension. Preferred compounds of Formula I are those in which A is a straight alkylene chain of two to four carbon atoms optionally substituted on the carbon atom adjacent to the nitrogen atom by a methyl group, $R_1$ is a substituent in the ortho position in relation to the aminoalkyl-oxy or -thio group selected from methyl, methoxy and trifluoromethyl groups and fluorine, chlorine and bromine atoms, $R_2$ and $R_3$ are the same or different and are selected from methyl, methoxy and trifluoromethyl groups and fluorine, chlorine, bromine and hydrogen atoms, and $R_5$ is a methyl group. Compounds of outstanding importance are those in which X is an oxygen atom, $R_1$ is an ortho-methyl or ortho-chloro group, and $R_2$ and $R_3$ are the same or different and represent chlorine or hydrogen atoms or methyl groups, $R_4$ represents a propargyl group, and $R_5$ represents a methyl group, for example, N-methyl-N-propargyl-2-(o-chlorophenoxy)ethylamine, N-methyl-N-propargyl-4-(o-chlorophenoxy)butylamine, N-methyl-N-propargyl-2-(2,6-dimethylphenoxy)isopropylamine, N - methyl-N-propargyl - 2 - (2,4,6-trichlorophenoxy)ethylamine, N-methyl - N - propargyl-3-(2,4,6-trichlorophenoxy)propylamine and N - methyl-N-propargyl-3-(2,4-dichlorophenoxy)propylamine, and their acid addition salts.

According to a feature of the invention, the compounds of general Formula I are prepared by reacting an alkylamine derivative of the formula P–NHR$_5$ with a reactive ester of the formula Y–Q, wherein one of the symbols P and Q represents the group

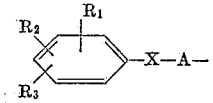
II and the other represents the group $R_4$ as hereinbefore defined, Y represents the acid residue of a reactive ester, such as a halogen atom or a sulphuric or sulphonic acid residue, and the other symbols are as hereinbefore defined.

According to another feature of the invention, those compounds of Formula I in which $R_5$ represents an alkyl or alkoxycarbonyl group are prepared by reacting an alkylamine derivative of the general formula:

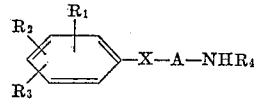
III with a compound of the formula Y–R$_5'$, wherein R$_5'$, represents a lower alkyl or lower alkoxycarbonyl group, and the other symbols are as hereinbefore defined.

The aforesaid reactions are conveniently effected in an inert organic solvent, such as an ether (e.g. diethyl ether), an alcohol (e.g. ethanol), a ketone (e.g. acetone) or a hydrocarbon (e.g. benzene or light petroleum) or a halogenated benzene hydrocarbon, in the presence of an acid-binding agent, for example an alkali metal or compound thereof such as an alkali metal carbonate, alkoxide, amide or hydride, or a tertiary base such as triethylamine. The acid-binding agent is conveniently an excess of the amine starting material of formula P–NHR$_5$ or of Formula III.

According to a still further feature of the invention, the compounds of Formula I are prepared by reacting a compound of the formula:

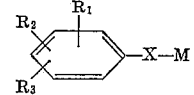
IV (wherein M represents a hydrogen atom or an equivalent of a metal such as an alkali metal, and the other symbols are as hereinbefore defined) with a compound of the general formula:

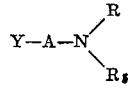
V (wherein the various symbols are as hereinbefore defined), preferably in an inert organic solvent such as an alcohol, e.g. ethanol.

According to another feature of the invention, the compounds of Formula I, in which R$_5$ represents a hydrogen atom or an alkyl group are prepared by the reduction by methods known per se of an amide of the formula:

VI wherein $R_4$ is as previously defined, and either R' is a grouping of the formula:

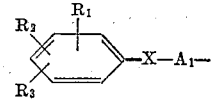
VII (wherein $A_1$ represents an alkylene chain of one to five carbons, which may be substituted by up to two lower alkyl groups, and $R_1$, $R_2$ and $R_3$ are as hereinbefore defined) and $R''$ represents a hydrogen atom or a lower alkyl group, or $R'$ represents a hydrogen atom or an alkyl group containing up to 3 carbon atoms, and $R''$ represents a grouping of Formula II. The reduction is preferably effected with lithium aluminium hydride in an anhydrous inert organic solvent, e.g. diethyl ether.

According to yet another feature of the invention, the compounds of Formula I are prepared by the decarboxylation of an ester of the formula:

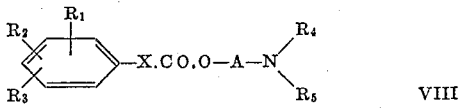   VIII (wherein the various symbols are as hereinbefore defined), for example, by heating the ester alone or in an inert organic solvent having a boiling point above 100° C.

According to a further feature of the invention, the compounds of Formula I, in which $R_5$ represents a hydrogen atom, are prepared by the reduction of an imine of the formula:

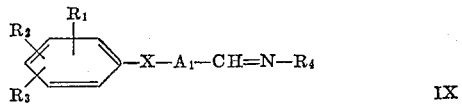   IX (wherein the various symbols are as hereinbefore defined) by methods known per se for the reduction of the grouping —CH=N— to —CH$_2$—NH—, for example, with sodium borohydride or, when $R_4$ represents a cyclopropyl group, with hydrogen in the presence of a suitable hydrogenation catalyst such as Raney nickel, platinum oxide or pallidised charcoal.

According to another feature of the invention, the compounds of Formula I, in which $R_4$ represents a propargyl group and $R_5$ represents a hydrogen atom or alkyl group, are prepared by reacting in manner known per se a secondary amine of the general formula:

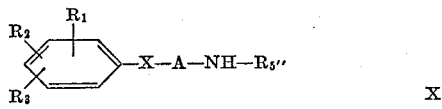   X (wherein $R_5''$ represents a hydrogen atom or a lower alkyl group, and the other symbols are as hereinbefore defined) with formaldehyde and acetylene in the presence of cuprous acetylide.

According to a still feature of the invention, the compounds of Formula I, in which $R_4$ represents a propargyl group, are prepared by the dehydrohalogenation by methods known per se of compounds of the general formula:

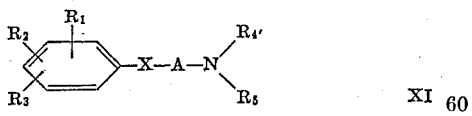   XI (wherein $R_4$ represents a 2- or 3-bromo-, chloro- or iodo-allyl group, or a 2,3-dibromo-, 2,3-dichloro- or 2,3-diiodo-propyl group, and the other symbols are as hereinbefore defined), for example, by treatment with sodamide in liquid ammonia.

In addition, the compounds of general Formula I, in which $R_5$ represents a methyl group, may be prepared by reduction by methods known per se of corresponding compounds of general Formula I in which $R_5$ represents a lower alkoxycarbonyl group, for example, with lithium aluminium hydride in an inert organic solvent, e.g. diethyl ether.

By the term "methods known per se" as used in this specification and accompanying claims is meant methods heretofore used or described in the chemical literature.

When the phenoxy- and phenylthio-alkylamines of general Formula I are used for therapeutic purposes in the form of acid addition salts, it should be understood that only those such salts should in practice be employed that contain anions that are relatively innocuous to the animal organism when used in therapeutic doses so that the beneficial physiological properties inherent in the parent compounds are not vitiated by side effects ascribable to those anions; in other words only non-toxic salts are contemplated. Suitable acid addition salts include hydrohalides (for example hydrochlorides), phospates, nitrates, sulphates, maleates, fumarates, citrates, tartrates, methane sulphonates, isethionates and ethane disulphonates. These salts may be made from the bases of general Formula I by methods known per se. For example, the acid addition salts may be made by mixing the base with an equivalent quantity of a non-toxic acid in a solvent and isolating the required salt by filtration after, if necessary, evaporation of part or all of the solvent. They may be purified by crystallisation or by any other method commonly used in the art.

The following examples illustrate the invention.

*Example I*

2-(2,4-dichlorophenoxy)ethyl bromide (60 g.) was added with stirring to an alcoholic solution of methylamine (180 ml., 33% w./v.) over 1 hour at room temperature. The mixture was heated under reflux for 1 hour and then concentrated in vacuo. The semi-solid residue was made alkaline with aqueous sodium hydroxide solution and extracted with ether. The ether extract was dried over anhydrous sodium sulphate and concentrated in vacuo to yield N-methyl-2-(2,4-dichlorophenoxy)ethylamine (27.4 g.; 56.2%), B.P. 155–160° C./11 mm.

A mixture of N-methyl-2-(2,4-dichlorphenoxy)ethylamine (30 g.), propargyl bromide (8.1 g.) and anhydrous ether (150 ml.) were heated under reflux for 17 hours. The reaction mixture was cooled and filtered to remove the precipitate of N - methyl-2-(2,4 - dichlorophenoxy) ethylamine hydrobromide which had separated. The filtrate was treated with a slight excess of ethereal hydrogen chloride and the precipitated salt filtered off. Recrystallisation (twice) of the salt from ethyl acetate/isopropanol/ether gave N-methyl - N - propargyl-2-(2,4-dichlorophenoxy)ethylamine hydrochloride (10.2 g.; 51%), M.P. 146–148° C.

*Example II*

N - methyl-4-(2,6-dimethylphenoxy)butylamine (B.P. 148–152° C./13 mm.) was prepared from 4-(2,6-dimethylphenoxy)butyl bromide in 69% yield according to the method described in Example I.

Reaction of N-methyl-4-(2,6-dimethylphenoxy)butylamine with propargyl bromide according to the method described in Example I gave N-methyl-N-propargyl-4-(2,6-dimethylphenoxy)butylamine hydrochloride in 60% yield, which melted at 131–132° C. after recrystallisation from ethyl acetate.

*Example III*

N-methyl-3-(p-chlorophenoxy)propylamine (B.P. 140–147° C./11 mm.) was prepared from 3-(p-chlorophenoxy)propyl bromide in 73% yield by the method described in Example I.

Reaction of N-methyl - 3 - (p-chlorophenoxy)propylamine with propargyl bromide by the method described in Example I gave N-methyl-N-propargyl-3-(p-chlorophenoxy)propylamine hydrochloride in 36% yield, which melted at 151–153° C. after recrystallisation from acetone/ethyl acetate.

*Example IV*

N-methyl-3-(2-methyl - 6 - allylphenoxy)propylamine (B.P. 148–155° C./8 mm.) was prepared by the method described in Example I from 3-(2-methyl-6-allylphenoxy) propyl bromide in 63% yield.

Reaction of N-methyl-3-(2-methyl - 6 - allyphenoxy) propylamine with propargyl bromide by the method described in Example I gave N-methyl-N-propargyl-3-(2-methyl - 6 - allylphenoxy)propylamine hydrochloride in 25% yield, which melted at 75–77° C. after recrystallisation from ethyl acetate/ether.

*Example V*

N-methyl-6-(2,4 - dichlorophenoxy)hexylamine (B.P. 153–157° C./0.3 mm.) was prepared by the method described in Example I from 6-(2,4-dichlorophenoxy)hexyl bromide in 64% yield.

Reaction of N-methyl-6-(2,4-dichlorophenoxy)hexylamine with propargyl bromide as in the method described in Example I gave N-methyl-N-propargyl-6-(2,4-dichlorophenoxy)hexylamine hydrochloride in 13% yield, which melted at 62–63° C. after recrystallisation from ethyl acetate.

*Example VI*

N-methyl-3-(2,4 - dichlorophenoxy)propylamine (B.P. 170–175° C./10 mm.) was prepared in 79% yield from 3-(2,4-dichlorophenoxy)propyl bromide according to the method described in Example I.

Reaction of N-methyl-3-(2,4-dichlorophenoxy)propylamine with propargyl bromide by the method described in Example I gave N-methyl-N-propargyl-3-(2,4-dichlorophenoxy)propylamine hydrochloride in 56% yield, which melted at 98.5–100° C. after recrystallisation from ethyl acetate.

*Example VII*

N-methyl-3-(3,4 - dichlorophenoxy)propylamine (B.P. 167–172° C./12 mm.) was prepared in 67% yield from 3-(3,4-dichlorophenoxy)propyl bromide by the method described in Example I.

Reaction of N-methyl-3-(3,4-dichlorophenoxy)propylamine with propargyl bromide also by the method described in Example I gave N-methyl-N-propargyl-3-(3,4-dichlorophenoxy)propylamine hydrochloride in 42% yield which melted at 127–129° C. after recrystallisation from ethyl acetate-isopropanol.

*Example VIII*

In a similar manner to that described in Example I, 3-o-allylphenoxypropyl bromide was converted to N-methyl-3 - o - allylphenoxypropylamine (B.P. 155–170° C./9 mm.) in 69% yield and this in turn, after reaction with propargyl bromide, gave N-methyl-N-propargyl-3-(o - allylphenoxy)propylamine hydrochloride in 35% yield, which melted at 125–127° C. after recrystallisation from acetone.

*Example IX*

N - methyl-2-(2,4-dichlorophenylthio)ethylamine (B.P. 171–175° C./12 mm.) was prepared from 2-(2,4-dichlorophenylthio)ethylbromide in a similar manner to that described in Example I.

N - methyl-2-(2,4-dichlorophenylthio)ethylamine (18 g.), propargyl bromide (9.4 g.) and potassium carbonate (10.5 g.) in ether (200 ml.) were heated with stirring under reflux for 8 hours. The reaction mixture was cooled and extracted with water (100 ml.). The ethereal layer was treated with toluene-p-sulphonyl chloride (20 g.) and 2 N sodium hydroxide solution (100 ml.) and the mixture shaken for 15 minutes. The ethereal layer was separated, washed with water and extracted with a slight excess of 2 N hydrochloric acid. The aqueous layer was removed, washed with ether (50 ml.), basified with aqueous sodium hydroxide and extracted with ether (3×100 ml.). The combined ethereal extract was dried over anhydrous magnesium sulphate, filtered and treated with a slight excess of ethereal hydrogen chloride. The solid precipitate was collected and recrystallised from acetone-methanol-ethyl acetate to yield N-methyl-N-propargyl-2-(2,4 - dichlorophenylthio)ethylamine hydrochloride as white prisms, M.P. 145–146° C., yield 5.0 g. (21%).

*Example X*

In a similar manner to Example IX, N-methyl-2-(o-chlorophenoxy)ethylamine [B.P. 131–141° C./15 mm., prepared in 69% yield from 2-(o-chlorophenoxy)ethyl bromide] was converted to N-methyl-N-propargyl-2-(o-chlorophenoxy)ethylamine hydrochloride (M.P. 145–148° C. after recrystallisation from ethyl acetate) in 24% yield.

*Example XI*

N - methyl - N - propargyl-2-(2,4-dimethylphenoxy) ethylamine hydrochloride (M.P. 91–93° C.) was prepared in 24% yield from N-methyl-2-(2,4-dimethylphenoxy)ethylamine (B.P. 135–136° C./18 mm.), which in turn was prepared in 77% yield from 2-(2,4-dimethylphenoxy)ethyl bromide, by the method described in Example IX.

*Example XII*

N - methyl - 3 - (2,4,6 - trichlorophenoxy)propylamine (B.P. 170–173° C./7 mm.) was prepared by the method described in Example I from 3-(2,4,6-trichlorophenoxy)-propyl bromide in 51% yield.

N - methyl - 3- (2,4,6 - trichlorophenoxy)propylamine (20.0 g.), propargyl bromide (8.9 g.) and anhydrous sodium carbonate (7.9 g.) were heated in ethanol (200 ml.) under reflux with stirring for 17 hours. The dark mixture was filtered and the filtrate concentrated in vacuo. The residual oil was fractionally distilled at 0.2 mm. pressure. The fraction boiling at 145–158° C. was collected, dissolved in ether and treated with a slight excess of ethereal hydrogen chloride. The solid precipitate was filtered off and recrystallised from isopropanol to give N - methyl - N - propargyl - 3 - (2,4,6 - trichlorophenoxy)-propylamine hydrochloride (4.6 g., 18%), M.P. 165–166° C.

*Example XIII*

N - methyl - 5 - (2,4 - dichlorophenoxy)pentylamine (B.P. 172–175° C./10 mm.) was prepared in 15% yield from 5-(2,4-dichlorophenoxy)pentyl bromide by the method described in Example I.

Reaction of N-methyl-5-(2,4-dichlorophenoxy)pentyl-amine with propargyl bromide in ether at room temperature for 17 hours followed by treatment of the filtrate with ethereal hydrogen chloride gave N-methyl-N-propargyl - 5(2,4 - dichlorophenoxy)pentylamine hydrochloride (44% yield), M.P. 100–102° C. after recrystallisation from acetone-ether.

*Example XIV*

N - methyl - 2 - (2,6 - dimethylphenoxy)ethylamine (B.P. 115–117° C./11 mm.) was prepared by the method described in Example I in 66% yield from 2-(2,6-dimethylphenoxy)ethyl bromide.

N - methyl - 2 - (2,6 - dimethylphenoxy)ethylamine (23.6 g.) and propargyl bromide (7.85 g.) were stirred in ether (150 ml.) at room temperature for 20 hours. A slight excess of ethereal hydrogen chloride was added to this mixture and the supernatant liquid decanted from the semi-solid precipitate. The precipitate was dissolved in water (100 ml.) and treated with shaking with toluene-p-sulphonyl chloride (20 g.) and 50% aqueous sodium hydroxide solution (25 ml.). The reaction mixture was extracted with ether (3×100 ml.) and the combined ether extracts dried over anhydrous magnesium sulphate. Addition of ethereal hydrogen chloride to the dried ether extract gave an oily prepicitate which crystallised on standing. Recrystallisation of the precipitate from acetone-methanol gave N-methyl-N-propargyl-2-(2,6-dimethylphenoxy)ethylamine hydrochloride (6.2 g., 37%), M.P. 173–174° C.

Example XV 2-(2,4,6-trichlorophenoxy)ethyl bromide (73 g.) dissolved in ethanol (100 ml.) was added over 1 hour to a stirred solution of methylamine in ethanol (147 ml.; 33% w./v.). The solution was heated on a steam bath for 3 hours and concentrated to a semi-solid residue in vacuo. The residue was suspended in water, made alkaline with 50% sodium hydroxide solution and extracted into ether (3×100 ml.). The combined ether extract was dried over anhydrous sodium sulphate and concentrated in vacuo. Distillation of the residue gave a fraction (26.5 g.) boiling at 164–167° C./15 mm. Treatment of a solution of this fraction in acetone with 48% aqueous hydrobromic acid followed by addition of ether gave a precipitate which was collected and recrystallised from a mixture of acetone-methanol-ether to give N-methyl-2-(2,4,6-trichlorophenoxy)ethylamine hydrobromide (15 g., 19%), M.P. 185–191° C.

N - methyl - 2 - (2,4,6 - trichlorophenoxy)ethylamine (11 g.), propargyl bromide (5.2 g.) and sodium carbonate (4.6 g.) in ethanol (100 ml.) were warmed under reflux with stirring for 18 hours. The suspension was filtered and the precipitate washed with ether. The filtrate and washings were combined and concentrated in vacuo. The dark residual oil was distilled in high vacuum and the fraction which distilled at 100–120° C./0.2 mm. collected. This fraction was dissolved in ether and treated with a slight excess of ethereal hydrogen chloride. The oily precipitate crystallised on standing and was collected and recrystallised from acetone-ether (charcoal) to give N - methyl - N - propargyl - 2 - (2,4,6 - trichlorophenoxy)ethylamine hydrochloride (4.1 g., 29%), M.P. 153–156° C.

Example XVI

A solution of 2,4-dichlorphenoxyacetone (478.5 g.) in ethanol (6000 ml.) containing methylamine (328.5 g.) was hydrogenated at 25° C. and at a pressure of 500 p.s.i. over Raney nickel (20%). Hydrogen uptake was completed in 2 hours. After removal of catalyst the filtrate was concentrated in vacuo. The residue was dissolved in ether and extracted with hydrochloric acid. The acid extract was basified with 50% w./v. sodium hydroxide solution and extracted into ether (1×2000 ml., 2×1000 ml.). The combined ether extracts were dried over anhydrous sodium sulphate and concentrated in vacuo. The residue was fractionally distilled through a 12″ Vigreux column in vacuo and the fraction boiling at 171–176° C./29 mm. collected. The yield of DL-N-methyl-2-(2,4-dichlorophenoxy)isopropylamine was 290.5 g. (57%). The hydrochloride salt of DL-N-methyl-2-(2,4-dichlorophenoxy)isopropylamine melted at 148–150° C.

DL - N - methyl - 2 - (2,4 - dichlorophenoxy)isopropylamine (29.3 g.) and propargyl bromide (7.7 g.) were heated in ether (250 ml.) under reflux for 18 hours. After cooling, the precipitate of N-methyl-2-(2,4-dichlorophenoxy)isopropylamine hydrobromide (15.5 g.) was filtered off. The filtrate was concentrated in vacuo and the residual oil distilled in high vacuum. The fraction boiling at 106–140° C./0.1 mm. was collected (12.5 g). This fraction was redistilled and the fraction distilling at 114–116° C./0.2 mm. collected. The yield of DL-N-methyl - N - propargyl - 2 - (2,4 - dichlorophenoxy)isopropylamine was 9.1 g. (46%). The hydrochloride salt of DL-N-methyl-N-propargyl-2-(2,4-dichlorophenoxy)isopropylamine recrystallised from ethyl acetate melted at 126.5–127.5° C.

Example XVII

N-methyl - 3 - (m-trifluoromethylphenoxy)propylamine (B.P. 125–132° C./18 mm.) was prepared from 3-(m-trifluoromethylphenoxy)propyl bromide in 62% yield by the method described in Example I.

Reaction of N-methyl - 3 - (m-trifluoromethylphenoxy)propylamine with propargyl bromide by the method described in Example I gave N-methyl-N-propargyl-3-(m-trifluoromethylphenoxy)propylamine hydrochloride, M.P. 97° C., in 47% yield.

Example XVIII

DL-N-methyl - 2 - (p-sec.-butylphenoxy)isopropylamine (B.P. 96–98° C./0.05 mm.) was prepared from p-sec.-butylphenoxyacetone in 17% yield in a manner similar to that described in Example XVI.

Reaction of DL-N-methyl-2-(p-sec.-butylphenoxy)isopropylamine with propargyl bromide by the method described in Example I gave DL-N-methyl-N-propargyl-2-(p-sec.-butylphenoxy)isopropylamine (B.P. 102–104° C./0.07 mm.) in 35% yield.

Example XIX

N-methyl-4-(p-n-butoxyphenoxy)butylamine (B.P. 128–132° C./0.05 mm.) was prepared from p-n-butoxyphenoxybutyl bromide in 50% yield by the method described in Example I.

Reaction of N-methyl - 4 - (p-n-butoxyphenoxy)butylamine with propargyl bromide by the method described in Example I gave N-methyl-N-propargyl-4-(p-n-butoxyphenoxy)butylamine hydrochloride, M.P. 101–102° C., in 22% yield.

Example XX 2,4-dichlorophenoxypropyl bromide (20.6 g.), N-methyl-propargylamine (5 g.), sodium carbonate (15.3 g.) and ethanol (150 ml.) were refluxed with stirring for 17 hours, then filtered to remove sodium bromide and excess sodium carbonate. The filtrate was concentrated and the residue taken up in ether (ca. 200 ml.). A further deposit of solid material was filtered off at this stage. The solution was concentrated and the crude product distilled to give a fraction (9.9 g.) boiling at 130–132° C./0.1 mm. This base was dissolved in dry ether and treated with a slight excess of dry ethereal hydrogen chloride. The resulting hydrochloride was filtered off and recrystallised from ethyl acetate to give N-methyl-N-propargyl-3-(2,4-dichlorophenoxy)propylamine hydrochloride (3.7 g.; 16%), M.P. 102–103° C.

Example XXI

Reaction of N-methyl-2-phenoxyethylamine with propargyl bromide by the method described in Example XIV gave N-methyl-N-propargyl-2-phenoxyethylamine hydrochloride as colourless plates in 34% yield, M.P. 114–116° C. after recrystallisation from acetone (twice).

Example XXII

DL-N - methyl - 2 - phenoxyisopropylamine (B.P. 102–105° C./7 mm.) was prepared in 67% yield from phenoxyacetone by the method described in Example XVI.

Reaction of the foregoing product with propargyl bromide in a similar manner to that described in Example XVI gave DL-N-methyl-N-propargyl-2-phenoxyisopropylamine hydrochloride in 24% yield as colourless microprisms, M.P. 100–101° C. after recrystallisation (twice) from a mixture of ethyl acetate/acetone/ether.

Example XXIII

N-methyl-4-phenoxybutylamine (B.P. 133–136° C./9 mm.) was prepared from 4-phenoxybutyl bromide in 56% yield according to the method described in Example I.

Reaction of N-methyl-4-phenoxybutylamine with propargyl bromide as described in Example I gave N-methyl-N-propargyl-4-phenoxybutylamine hydrochloride in 36% yield, M.P. 130–131° C. after recrystallisation from isopropanol.

Example XXIV

In the same way as that described in Example I, N-methyl-4-o-chlorophenoxybutylamine (B.P. 159–163° C./10 mm., prepared in 58% yield from 4-o-chlorophenoxybutylbromide) was converted to N-methyl-N-propargyl-4-o-chlorophenoxybutylamine hydrochloride in 68% yield, M.P. 120–121° C. after recrystallisation from isopropanol.

Example XXV

In a similar manner to that described in Example I, 3-(2,6-dimethylphenoxy)propyl bromide was converted to N-methyl - 3 - (2,6 - dimethylphenoxy)propylamine (B.P. 132–135° C./10 mm.) in 63% yield and this in turn, after reaction with propargyl bromide, gave N-methyl-N-propargyl-3 - (2,6 - dimethylphenoxy)propylamine hydrochloride in 32% yield, M.P. 156–158° C. after recrystallisation (twice) from acetone/isopropanol.

Similarly prepared was N-methyl - N - propargyl-3-(o-methoxyphenoxy)propylamine hydrochloride in 62% yield (M.P. 101–103° C. after recrystallisation from isopropanol) from N - methyl-3 - (o - methoxyphenoxy)propyl amine (B.P. 147–150° C./10 mm.).

Example XXVI

N-methyl - 6 - (o - chlorophenoxy)hexylamine (61.3 g., B.P. 175–187° C./10 mm.), (prepared by the method described in Example I in 68% yield), and propargyl bromide (9.95 ml.) were reacted in boiling ether (500 ml.) for 5 hours. The resultant precipitate was filtered off and the filtrate concentrated in vacuo and the fraction which boiled at 129–133° C./0.02 mm. collected. The product (19.5 g.) was dissolved in ether and treated with a slight excess of ethereal hydrogen chloride. The precipitate was collected, crystallised from ethyl acetate-ether to give N-methyl-N-propargyl-6-(o-chlorophenoxy)hexylamine hydrochloride (M.P. 86–89° C.) in 50% yield.

Example XXVII

Reaction of propargyl bromide with N-methyl-3-phenoxypropylamine according to the method described in Example I gave N-methyl-N-propargyl-3-phenoxypropylamine hydrochloride in 44% yield, M.P. 108–110° C. after recrystallisation from acetone.

Example XXVIII

In a similar manner to that described in Example XVI, o-chlorophenoxyacetone was converted to DL-N-methyl-2-(o-chlorophenoxy)isopropylamine (B.P. 126–130° C./10 mm.) in 66% yield.

Reaction of DL - N - methyl-2-(o-chlorophenoxy)isopropylamine with propargyl bromide following the procedure described in Example XVI gave DL-N-methyl-N-propargyl - 2 - (o-chlorophenoxy)isopropylamine hydrochloride in 23% yield, M.P. 119.5–120° C.

Example XXIX

By the method described in Example XIV, DL-N-methyl-2-(2,6-dimethylphenoxy)isopropylamine (B.P. 133–140° C./15 mm., prepared in 48% yield from 2,6-dimethylphenoxyacetone) was converted to DL-N-methyl-N-propargyl - 2 - (2,6-dimethylphenoxy)isopropylamine hydrochloride in 17% yield, M.P. 162–163° C. after recrystallisation from ethyl acetate-isopropanol.

Example XXX

N-methyl-3-(2,4-dimethylphenoxy)propylamine (B.P. 140–145° C., 12 mm.) was prepared in 54% yield by the method described in Example I.

N-methyl - 3 - (2,4-dimethylphenoxy)propylamine (43 g.) and propargyl bromide (13.4 g.) were reacted in boiling ether (200 ml.) for 3 hours. The precipitate was filtered off and the filtrate concentrated in vacuo. The resultant oil was fractionally distilled in vacuo and the fraction boiling at 171–175° C./12 mm. collected. The distillate dissolved in ether was treated with a slight excess of ethereal hydrogen chloride and the precipitate collected and recrystallised from ethyl acetate to yield N-methyl - N - propargyl - 3 - (2,4 - dimethylphenoxy)-propylamine hydrochloride (17.5%), M.P. 110° C.

The present invention further includes within its scope pharmaceutical compositions which comprise, as active ingredient, at least one phenoxy- or phenylthio-alkylamine of general Formula I, or non-toxic acid addition salt thereof, together with a pharmaceutical carrier. The invention includes especially such compositions made up for oral or parenteral administration. In clinical practice the compounds of the present invention will normally be administered orally in the form of their salts, so that compositions suitable for oral administration are preferred.

Solid compositions for oral administration include compressed tablets, pills, dispersible powders, and granules. In such solid compositions one or more of the compounds of general Formula I is or are admixed with at least one inert diluent such as calcium carbonate, potato starch, alginic acid, or lactose. The compositions may also comprise, as is normal practice, additional substances other than inert diluents, e.g. lubricating agents such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention for oral administration also include capsules of absorbable material such as gelatin, containing one or more of the active substances with or without the addition of diluents or excipients.

Preparations according to the invention for parenteral administration include sterile aqueous or non-aqueous solutions, suspensions or emulsions. Examples of non-aqueous suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations.

The following example illustrates pharmaceutical compositions according to the invention.

Example XXXI

Tablets of the formula:

| | Mg. |
|---|---|
| DL - N - methyl - N - propargyl - 3 - (2,4 - dichlorophenoxy)propylamine hydrochloride | 10 |
| Lactose | 49.5 |
| Starch | 20 |
| Dextrin | 20 |
| Magnesium stearate | 0.5 | are prepared by intimately mixing the amine hydrochloride, lactose, starch and dextrin and passing the mixture through a 60-mesh British Standard sieve. After addition of the magnesium stearate, the mixture is granulated to a suitable size and the granules compressed to form tablets.

Instead of the amine salt specified in the above formulation any other amine within the terms of general Formula I may be employed or any acid addition salt thereof.

We claim:
1. A member of the class consisting of the phenoxy-alkylamines of the formula:

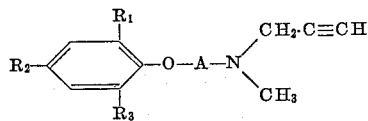

wherein A represents alkylene of 2 to 4 carbon atoms of which at least 2 carbon atoms separate the indicated oxygen and nitrogen atoms, $R_1$ represents a member of the class consisting of alkyl of up to four carbon atoms, and chlorine, $R_2$ and $R_3$ each represents a member of the class consisting of hydrogen, chlorine, and alkyl of up to 4 carbon atoms, and non-toxic acid addition salts thereof.

2. A member of the class consisting of N-methyl-N-propargyl-2-(o-chlorophenoxy)ethylamine and non-toxic acid addition salts thereof.

3. A member of the class consisting of N-methyl-N-propargyl-4-(o-chlorophenoxy)butylamine and non-toxic acid addition salts thereof.

4. A member of the class consisting of N-methyl-N-propargyl-2-(2,6-dimethylphenoxy)isopropylamine and non-toxic acid addition salts thereof.

5. A member of the class consisting of N-methyl-N-propargyl-2-(2,4,6-trichlorophenoxy)ethylamine and non-toxic acid addition salts thereof.

6. A member of the class consisting of N-methyl-N-propargyl-3-(2,4,6-trichlorophenoxy)propylamine and non-toxic acid addition salts thereof.

7. A member of the class consisting of N-methyl-N-propargyl-3-(2,4-dichlorophenoxy)propylamine and non-toxic acid addition salts thereof.

References Cited by the Examiner

UNITED STATES PATENTS

| | | | |
|---|---|---|---|
| 2,769,839 | 11/1956 | Fincke | 260—570.5 |
| 2,884,455 | 4/1959 | Robertson et al. | 260—570.8 |
| 2,897,236 | 7/1959 | Moss | 260—570.5 |
| 2,997,422 | 8/1961 | Tedeschi | 167—65 |
| 3,011,945 | 12/1961 | Bolling | 167—65 |
| 3,056,836 | 10/1962 | Moed | 260—570.6 |
| 3,079,403 | 2/1963 | Weinstock | 260—570.5 X |
| 3,081,336 | 3/1963 | Kaiser et al. | 167—65 X |
| 3,083,226 | 3/1963 | Horrom et al. | 260—570.9 X |
| 3,098,010 | 7/1963 | Everett et al. | 260—470.6 X |
| 3,142,554 | 7/1964 | Godfrey | 260—570.7 X |

FOREIGN PATENTS 595,586  4/1960  Canada.

OTHER REFERENCES

Woolley: Nature, vol. 180, pp. 630–3 (1957).

CHARLES B. PARKER, *Primary Examiner.*

FRANK CACCIAPAGLIA, Jr., JOSEPH P. BRUST, *Examiners.*